United States Patent [19]
Hileman et al.

[11] Patent Number: 5,908,483
[45] Date of Patent: Jun. 1, 1999

[54] APPARATUS AND PROCESS FOR MOLDING OF GLASS

[75] Inventors: Kenneth Hileman, deceased, late of Climax, Rosemary Hileman, executrix; Stanley E. Houston, Jr., Bainbridge; Russell W. Roe, Albany, all of Ga.

[73] Assignee: Lynch Machinery, Inc., Bainbridge, Ga.

[21] Appl. No.: 08/850,196

[22] Filed: May 2, 1997

Related U.S. Application Data

[60] Provisional application No. 60/029,456, Oct. 30, 1996.

[51] Int. Cl.⁶ .......................... C03B 11/00; C03B 11/02; C03B 11/16
[52] U.S. Cl. ............................ 65/29.12; 65/66; 65/158; 65/160; 65/308; 65/318; 65/362; 65/DIG. 13
[58] Field of Search .................. 65/29.12, 29.15, 65/66, 72, 158, 160, 161, 226, 308, 318, 322, DIG. 13, 362

[56] References Cited

U.S. PATENT DOCUMENTS

| | | |
|---|---|---|
| 3,471,281 | 10/1969 | Bittner et al. . |
| 3,607,194 | 9/1971 | Ayers . |
| 3,810,104 | 5/1974 | Markley . |
| 3,810,118 | 5/1974 | Kiffmeyer . |
| 3,942,158 | 3/1976 | Dummermuth . |
| 3,953,187 | 4/1976 | James . |
| 4,118,792 | 10/1978 | Struger et al. . |
| 4,165,534 | 8/1979 | Dummermuth . |
| 4,554,001 | 11/1985 | Shields et al. . |
| 4,723,976 | 2/1988 | Shanaberger . |
| 4,858,101 | 8/1989 | Stewart et al. . |
| 5,287,548 | 2/1994 | Flood et al. . |
| 5,644,227 | 7/1997 | Geisel . |
| 5,653,779 | 8/1997 | Saito et al. . |
| 5,707,414 | 1/1998 | Leidy . |

*Primary Examiner*—Steven P. Griffin
*Attorney, Agent, or Firm*—Banner & Witcoff Ltd.

[57] ABSTRACT

A press head drive cylinder control having a force sensing, force signal providing load cell on the drive cylinder of a glass molding press. The glass molding press having a base, a mold table rotatably mounted on the base, a plurality of mold positions on the table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station. The press head drive cylinder control responds to force signals from the load cell to control the press head drive cylinder location, movement, and pressing force, during glass molding.

34 Claims, 7 Drawing Sheets

APPARATUS AND PROCESS FOR MOLDING OF GLASS

This Application claims benefit of Provisional Application 60/029,456, filed Oct. 30, 1996.

BACKGROUND OF THE INVENTION

This invention relates to apparatus and methods for the molding of glass, such as glass molding presses and methods for the formation of television and computer faceplates. More particularly, this invention relates to the mechanisms and methods by which such presses are controlled.

A desirable machine for the production of glass products from gobs includes a vertically reciprocable ram or plunger which is movable to a molding position with an underlying mold. Glass is introduced to the mold as a gob while the ram is raised. The ram is then extended downward to the gob and mold, pressing the glass against the mold. Once the glass solidifies sufficiently, the ram is raised. A table carrying the mold is indexed to carry the mold to new workstations, while successive molds are successively indexed under the ram.

Increased speeds of production are highly desirable. In 1976, Lynch Corporation, then of Anderson, Ind., introduced a control system for operating the ram of glass molding machines which substantially advanced the art of such machines. This control, disclosed in U.S. Pat. No. 3,953,187 issued on Apr. 27, 1976, provided for rapid lowering of the ram to the mold, and numerous other advantages. Hydraulic circuitry was employed, and production speed was substantially improved.

In 1988, Owens-Illinois Television Products, Inc., of Toledo, Ohio, now called Techneglas, patented and disclosed another control. This control maintained the Lynch concept of rapid lowering of the ram to the mold. It added ram movement causing a spike of ram pressure as the ram contacted the gob in the mold. This ram pressure spike was employed as a signal to cause a controller to reduce pressure linearly to a final pressing pressure. The spike, linear reduction, and final pressing pressure are as shown along the "Down Ram Pressure" line of FIG. 2 of U.S. Pat. No. 4,723,976, in the region of time from 4.8 to 7.5 seconds, as charted. Oilgear Company of Milwaukee, Wis., was the recognized supplier of the servo control of the system.

U.S. Pat. Nos. 3,953,187 and 4,723,976 are incorporated by reference. U.S. Pat. No. 4,554,001 issued Nov. 19, 1985 is also incorporated by reference.

SUMMARY OF THE INVENTION

Despite the advances of the art, opportunity has remained for invention in the apparatus and methods for molding of glass. Production speed may be advanced further. Deficiencies of present controls may be overcome. As an example, both control systems of U.S. Pat. Nos. 3,953,187 and 4,723,976 rely on hydraulic control system pressure for control signaling. In the system of U.S. Pat. No. 4,723,976, the spiking of hydraulic control system pressure is the signal by which the controller recognizes that pressure reduction for glass molding is required.

Unfortunately, glass products are often permanently marked and damaged by impact marks. Impact marks result from undesirable impacts of hydraulic rams on gobs. Reduction and elimination of impact marks remains necessary.

In summary, therefore, in one aspect, the invention is an improvement in the apparatus and methods by which glass is molded in glass molding presses. Such apparatus may include a glass molding press, the press of the type having a base, a mold table rotatably mounted on the base, a plurality of mold positions on the table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station. An improvement according to the invention is the inclusion on the press of a press head drive cylinder control, where the control comprises a force sensing, force signal providing load cell on the drive cylinder, and means responsive to force signals from the load cell to control the press head drive cylinder location, movement, and pressing force.

The full scope the invention, and all its objects, aspects, and advantages will be fully understood by a complete reading of this specification in all its parts, without restriction of one part from another. Therefore, a detailed description of the preferred embodiments of the invention follows, and a drawing accompanies this specification.

BRIEF DESCRIPTION OF THE DRAWING

The preferred embodiments of the invention are hereafter described with reference to the accompanying drawing. The drawing consists of seven figures, as follows.

DETAILED DESCRIPTION OF THE PREFERRED EMBODIMENTS

Figure 1:
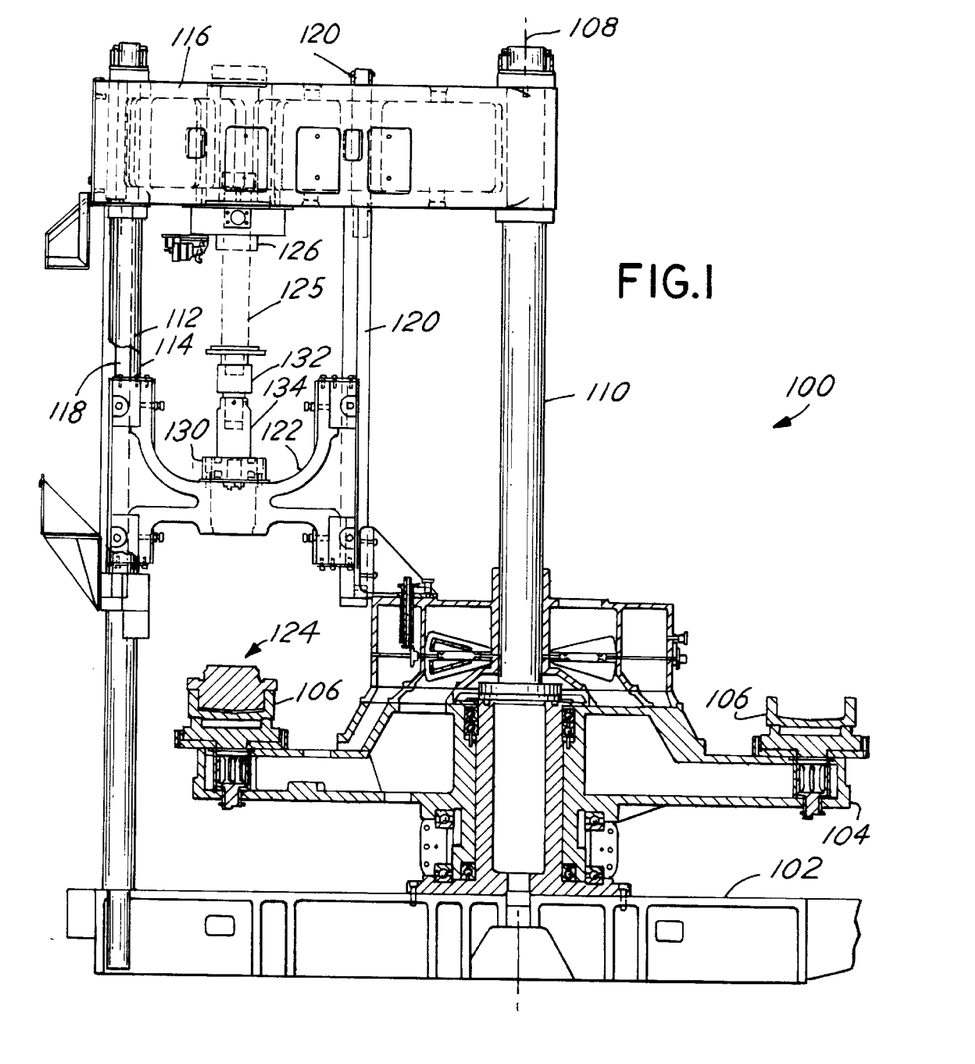
FIG. 1 is a side elevation view of the glass molding machinery of the preferred embodiment of the invention.
Figure 2:
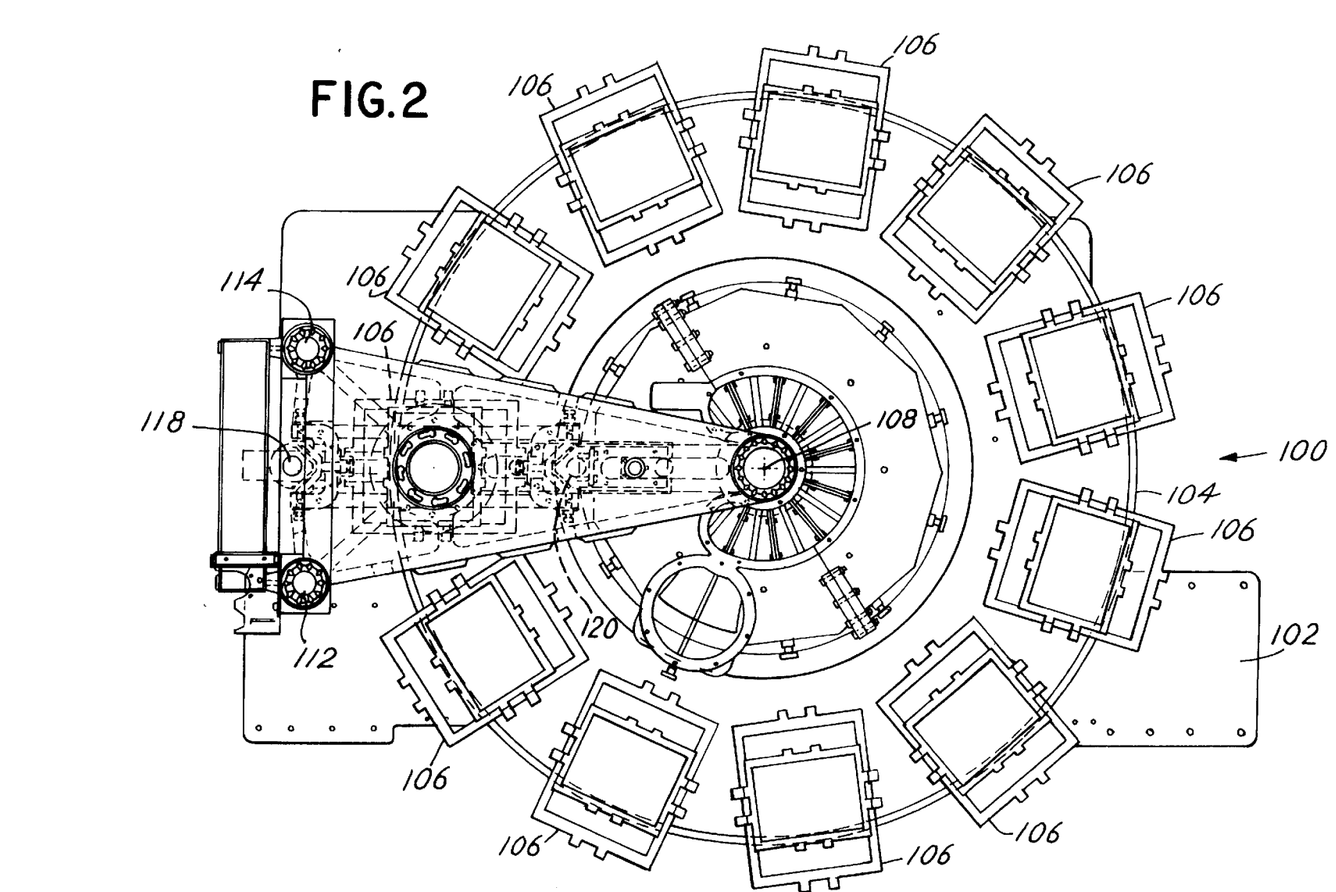
FIG. 2 is an end elevation view of the machinery of FIG. 1.

Preferred embodiments of the invention include and are practiced in a process and with equipment generally shown as in FIGS. 1–5. Referring to FIG. 1, a press generally identified by reference numeral 100 includes a base 102 and thereabove a mold table 104. Referring to FIG. 2, the table 104 is circular in plan view, and supports a plurality of glass molds 106. The glass molds 106 are spaced circumferentially around the table 104, at equal radii from a central axis 108, and equal arcs about the table 104. The axis 108 is the axis of the table 104, and also an upright central shaft 110. The table 104 is mounted on the shaft 110 for rotation about the axis 108. Appropriate bearings are employed. The shaft 110 is mounted to the base 102.

Figure 3:
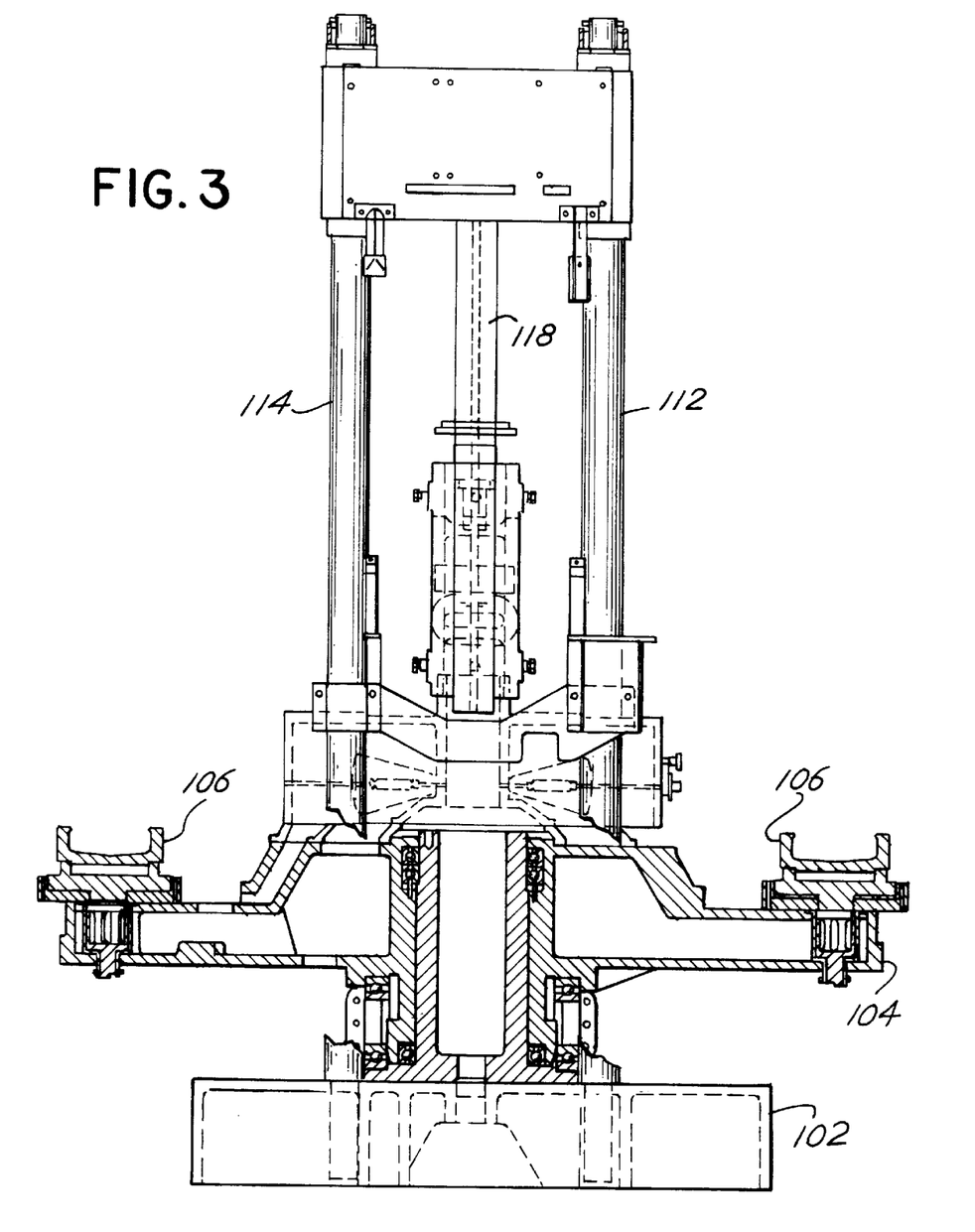
FIG. 3 is a plan view of the machinery of FIG. 1.

Referring to FIGS. 1, 2 and 3, two upright side columns 112, 114 stand alongside the mold table 104 atop the base 102. The side columns 112, 114 are spaced perpendicularly an equal distance from a plane extending through the central axis 108. A yoke 116 is supported between the side columns 112, 114 and the central shaft 110.

Together, the side columns 112, 114, central shaft 110, and yoke 116 comprise and support a press head tower. More specifically, the side columns 112, 114, central shaft 110 and yoke 116 support two spaced, vertical rods 118, 120, which extend downward from the yoke 116 toward the mold table 104. The rods 118 and 120 in turn support a cross head assembly 122, over a molding station 124. The cross head assembly 122, at a lower end, and the side columns 112, 114, central shaft 110 and yoke 116, at an upper end, support and guide a drive shaft 125 of a press head drive cylinder 126. The press head drive cylinder 126 is mounted to the yoke 116, and its drive shaft 125 extends downward for reciprocation toward and away from the molding station 124.

Figure 4:
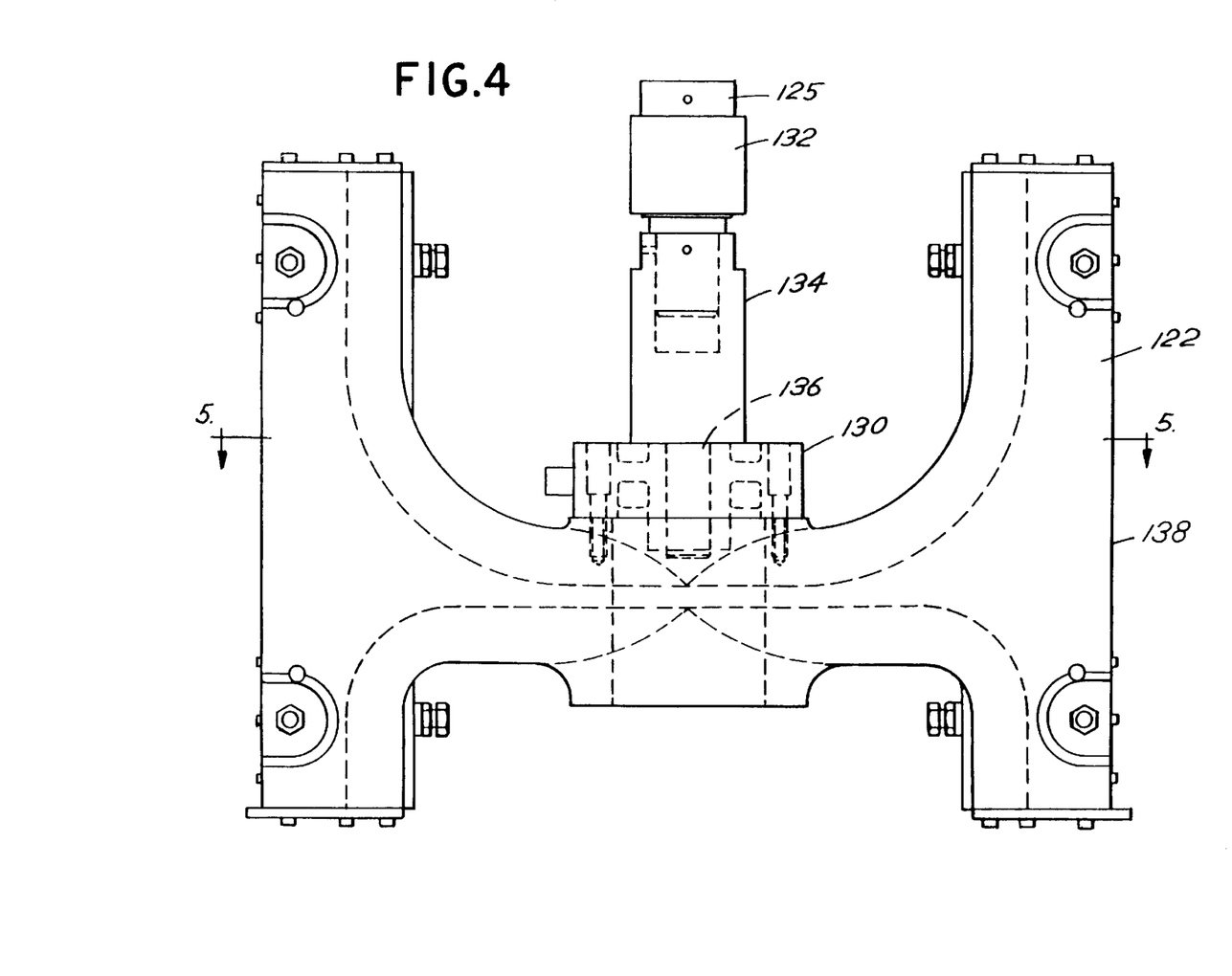
FIG. 4 is an elevation view of the structure of the machinery of FIG. 1 in the area of the cross head assembly.
Figure 5:
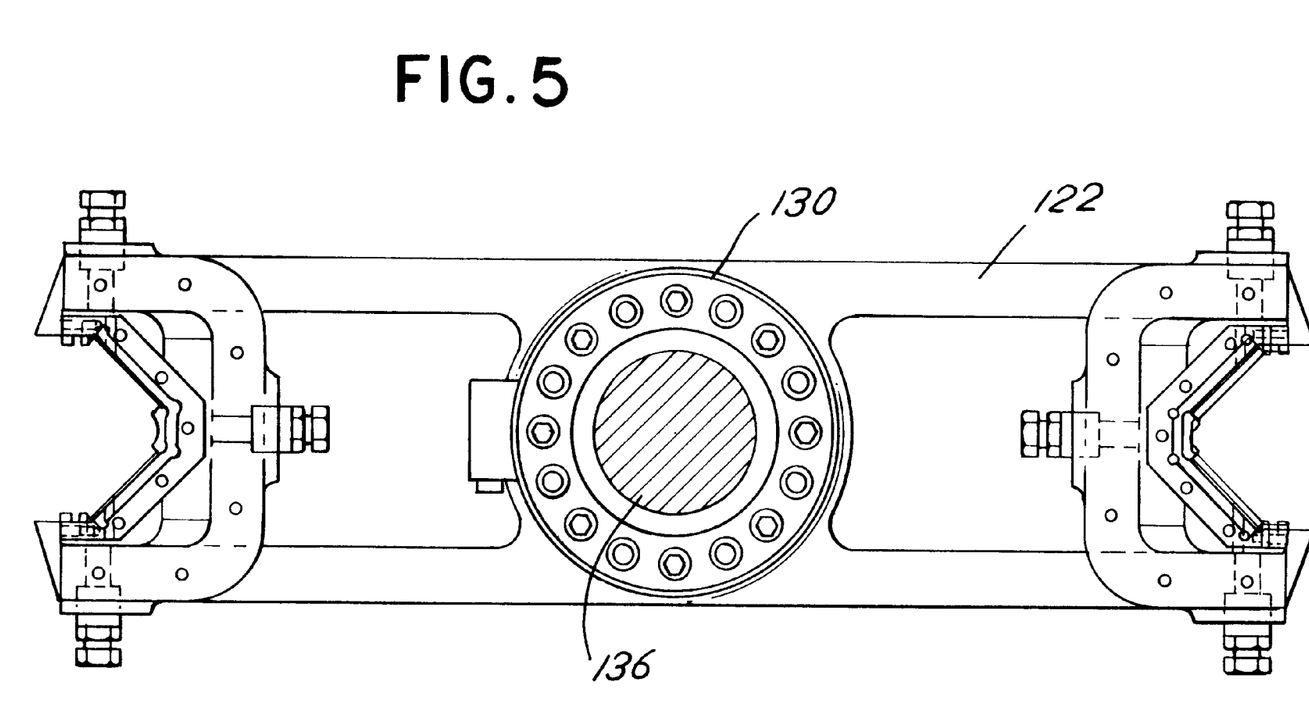
FIG. 5 is a section view of the cross head assembly taken along line 5—5 in FIG. 4.

As seen best in FIG. 4, a load cell 130 is located on the cross head assembly 122, below the drive shaft 125. A rod alignment coupler 132 connects the drive shaft 125 to an adapter stud 134. The adapter stud 134 includes a load cell shaft 136, which extends into the center of the load cell 130. A lock nut holds the load cell 130 on the load cell shaft 136, and the load cell 130 is bolted to the cross head casting 138. The load cell 130 may be attached to the press head drive cylinder 126 by means of a coupling and a spacer (not shown).

The load cell 130 responds to force and produces a signal directly related to the force on the load cell 130. The load cell 130 may be a modified Strainsert brand load cell. The load cell 130 is preferably capable of providing a signal having a response time of 1000–2000 Hz while still providing appropriate shielding from electrical and electromagnetic noise. The load cell 130 includes signal conditioning circuitry (not shown) which is preferably assembled with mounting brackets. The load cell 130 and the signal conditioning circuitry are preferably housed inside a metal shielding to maintain appropriate shielding from noise. A shielded cable may also be used as the connection between the load cell 130 and the signal conditioning circuitry. The load cell 130 generally has circuitry for processing of the sensed force and generating the associated electrical signal. In the preferred system, the circuitry of the load cell 130 is structurally reinforced with techniques generally known in the art to sustain stresses due to operation of the press head. For instance, the circuitry of the load cell 130 may be securely soldered, the circuitry may be placed on thicker circuit boards and clamped securely in place.

Figure 6:
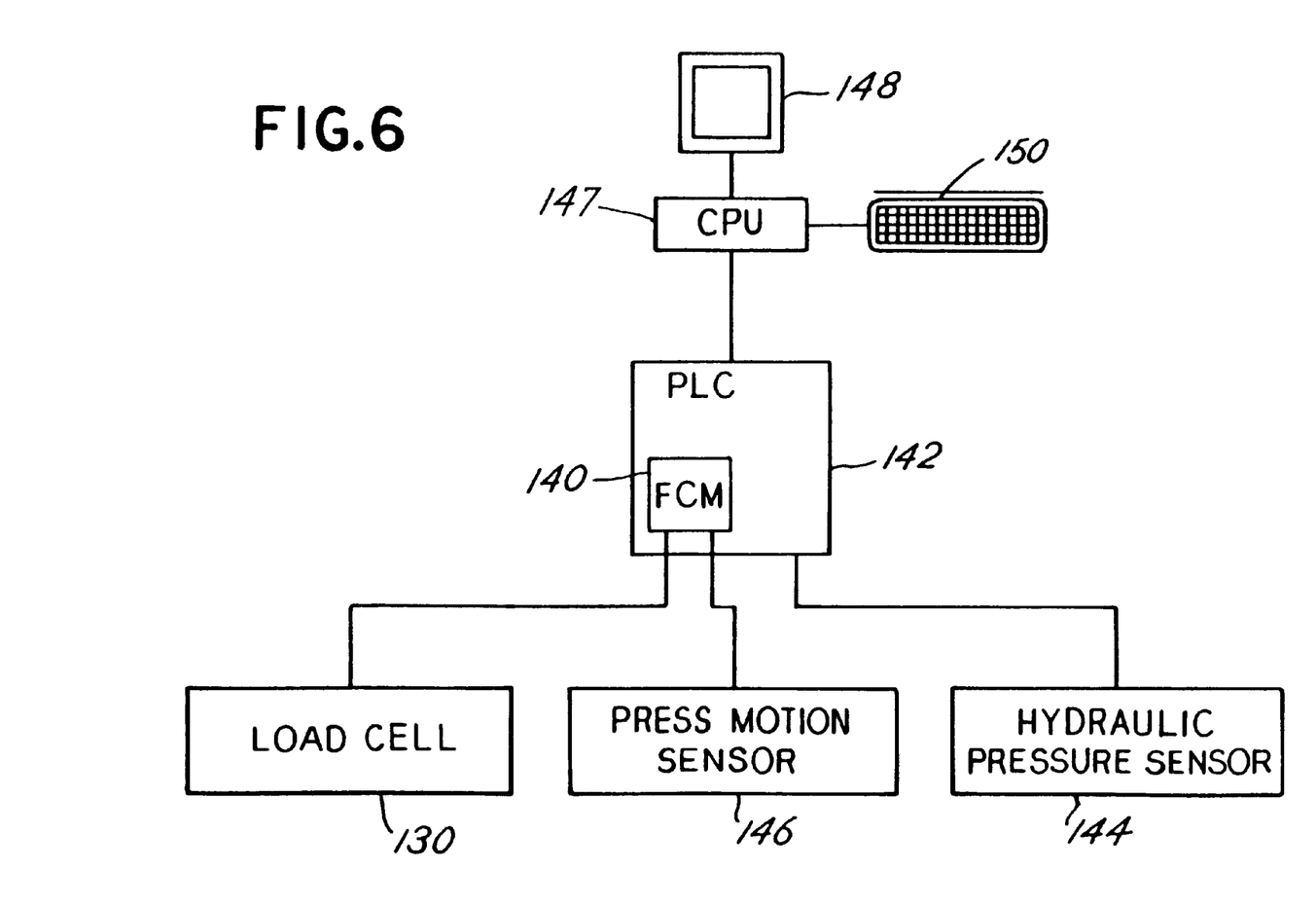
FIG. 6 is a diagrammatic view of a programmable logic controller, force control module, load cell, and associated components of the preferred control of the preferred glass molding press.

Referring to FIG. 6, the signal of the load cell 130 is provided to a Force Control Module ("FCM") 140, within a Programmable Logic Controller ("PLC") 142. The PLC 142 may be as shown in any of the following U.S. patents assigned to Allen-Bradley Co.: [U.S. Pat. Nos.] 3,810,104; 3,810,118; 3,942,158; 4,118,792; 4,165,534; 4,858,101; and [U.S. Pat. No. ] 5,287,548, [and associated issued U.S. patents of Allen-Bradley Co., Inc.,] all of which are incorporated by reference. The PLC 142 is preferably an Allen-Bradley PLC 5/40 with an Allen-Bradley SLC 5/04 as an auxiliary component. The PLC 142, as conventional, is housed in a rack (not shown) which includes a series of slots for printed circuit board modules, such as the FCM 140. All connected modules are interconnected by a series of signal buses to which the modules are connected. The rack further includes a power supply module (not shown), a system controller module (not shown), a number of program execution modules, and a plurality of input/output scanner modules (not shown). Scanner modules are connected to sensors 144, 146 of hydraulic pressure in the press head cylinder hydraulic system, and of press head cylinder position, respectively.

The system controller module of the PLC 142 supervises communication between the PLC 142 and a personal computer workstation shown diagrammatically as a Central Processing Unit ("CPU") 147, a monitor 148 and a keyboard 150. The system controller module exchanges data with the personal computer workstation, providing system reporting, input, and troubleshooting.

The PLC 142 sequentially operates the mechanisms of the press 100 according to a stored program. The program includes instructions which are read in rapid sequence and interpreted to examine the condition of the sensing devices (130, 144, and 146) on the press 100, and to energize and de-energize the operating devices of the press 100 based on the conditions of the sensing devices 130, 144, and 146.

As with the past glass molding presses of U.S. Pat. Nos. 3,953,187 and 4,723,976, the preferred press 100 advances and retracts the drive shaft 125 through a cycle of movement for glass molding. The shaft 125 drives a press head (not shown) forward and down into association with a glass mold 106 at the molding station 124, after a glass gob delivery mechanism (not shown) delivers a glass gob to a glass mold 106 at the molding station 124. Force on the glass gob is maintained through molding, and the press head is then retracted upward. Retraction allows for indexing of the mold table 104, and delivery of a next glass gob to a next glass mold 106 at the molding station 124. The motion of the press head drive cylinder 126 is achieved using a hydraulic pump (not shown).

Charted as location over time, the movement of the press head constitutes a profile of movement. Charted as force over time, the force of the press head against the glass gob also constitutes a profile of force. In the preferred system with the preferred load cell 130 and associated control, profiles of movement and force are readily selected and adjusted by the press customer and/or operator. The profiles of movement and force are preferably stored in the PLC 142 which may contain in memory numerous profiles of movement and force. These profiles may be used by the FCM 140 for controlling the movement and force of the press head drive cylinder 126.

In relation to controlling the press head drive cylinder 126, the PLC 142 preferably operates separately from the FCM 140. The FCM 140 receives the signal from the load cell 130, representative of force, and the signal from the presshead cylinder position sensor 146, representative of press head cylinder position. These signals are then scanned according to the FCM's own parameters. The FCM 140 communicates with the PLC 142 by receiving and sending instructions to the PLC 142. Upon start-up of the system, the desired movement and force profiles are loaded into the FCM 140 from the PLC 142. Once loaded, the FCM 140 may then operate independently of the PLC 142. If a change in the movement or force profile was required, the FCM 140 may suspend operation of the press head, download the new profile and resume operation of the press head. The PLC 142 may at times query the FCM 140 for a status report which may then be supplied in response. Based on the status report and information from the hydraulic pressure sensor 144, the PLC 142 may then generate a statistical report of the operation of the press 100. The FCM 140 is capable of controlling the position and force of the press head drive cylinder 126 by making proper adjustments to a hydraulic pump (not shown). The hydraulic pump, which is generally known in the art, serves to operate the press head drive cylinder 126.

Figure 7:
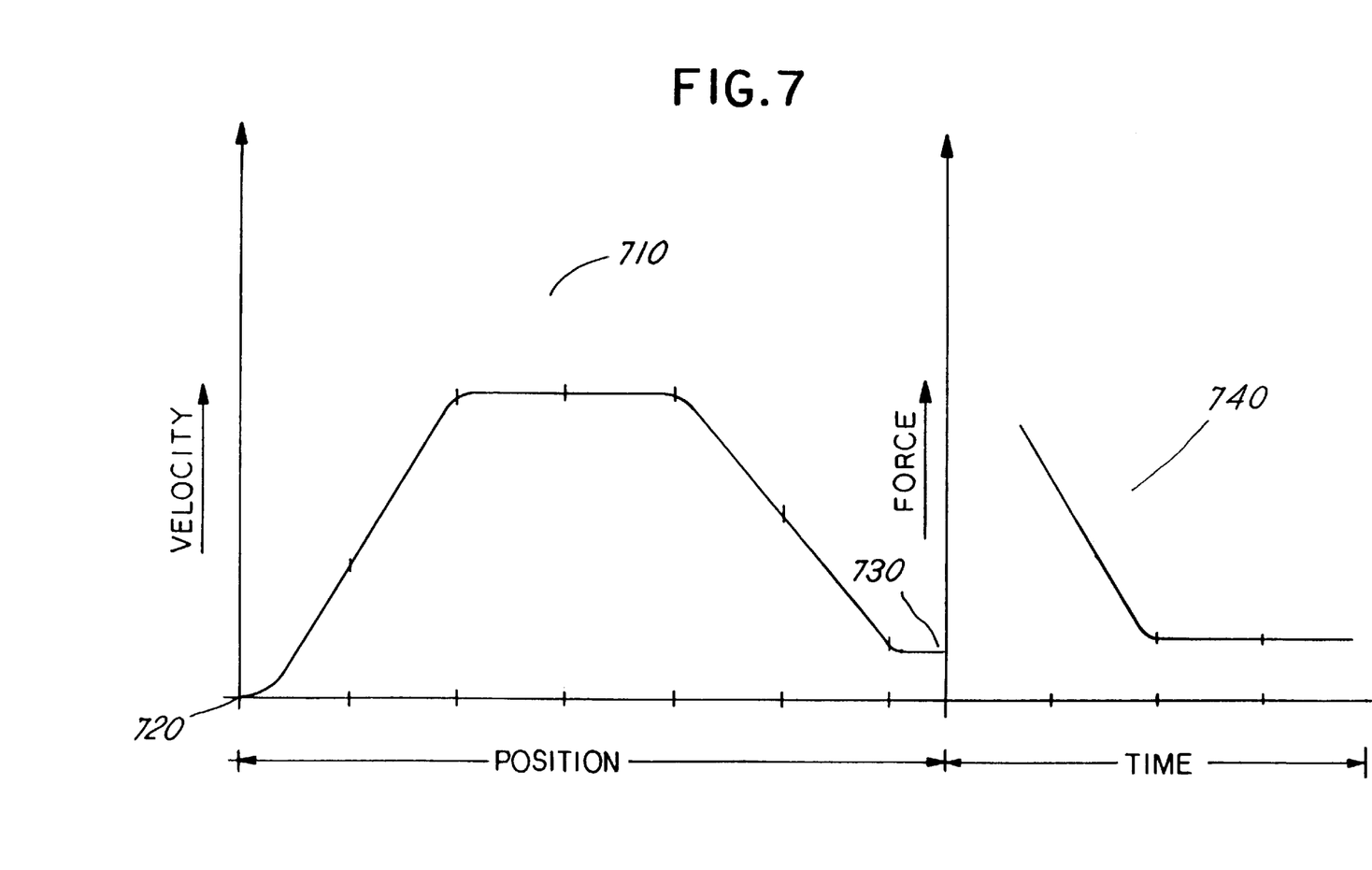
FIG. 7 is a graph illustrating a movement and force profiles for the press head.

Generally, press head movement begins with rapid movement toward the mold at the molding station 124, under control of motion. Control is preferably shifted to control of force as soon as the press head reaches a glass gob in a mold at the molding station 124. Thereafter, force is rapidly increased to desired glass molding force. In other words, the system may switch its control of the press head once the press head reaches a predetermined position along its path. The position of the press head is determined by the presshead cylinder position sensor 146. The presshead cylinder position sensor 146 is preferably a linear transducer which is an LH-type temposonic linear transducer provided by MTS Systems Corporation. For purposes of illustration only, FIG. 7 provides a graph of a typical movement profile and force profile. The movement profile 710 establishes the velocity of the press head as a function of position. The movement profile portion is charted with the origin 720 representing the uppermost position of the press head in its range of motion. The final position 730 represents the point where the press head is in contact with the glass gob. At this point, control of motion may switch to control of force. The force profile 740 may chart force as a function of time. Alternatively, the shift from control of motion to control of force may be achieved as a matter of force when the load cell 130 senses the press head force of the press head against a glass gob in a glass mold 106 at the molding station 124.

No spiking or sudden changes of movement or force is utilized, as preferred. Particularly, during rapid movement of the press head under control of motion, a sensing of any force spike, indicating an obstruction in the press head path, suspends operation of the press head. Similarly, during pressing of the glass glob, sensing of any motion spike suspends operation of the press head. During any part of the press head motion, if the motion of the press head becomes uncontrollable, the force control module 140 disables all motion. Also, if the force control module 140 receives information from the press head motion sensor 146 that suggests impossible movement (such as a motion spike), the force control module 140 disables all motion.

Advantages of the preferred press 100 include direct sensing of molding press force, as opposed to hydraulic drive system pressure. Direct sensing of molding press force through the load cell 130 eliminates sensing of the effects of the press systems extraneous to molding press force, which may occur with sensing of hydraulic drive system pressure. No extraneous effects of compression in the hydraulic system are sensed. Force is sensed and controlled directly.

As additional preferred embodiments, the invention comprises methods utilizing the apparatus of the invention, and like aspects of the invention.

The preferred embodiments and the invention are now described in such full, clear, concise and exact language as to enable a person of ordinary skill in the art to make and use the invention. To particularly point out and distinctly claim the subject matter regarded as invention, the following claims conclude this specification.

We claim:

1. A press head drive cylinder control system for a glass molding press having a base, a mold table rotatably mounted on the base, a plurality of mold positions on the mold table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station, comprising in combination:
   a. a force sensor operatively attached to the press head drive cylinder for sensing the force applied by the press head and responsively producing a force signal;
   b. a force controller coupled to the force sensor for receiving and processing the force signal and for producing force control information the force controller comprising a force control module within a programmable logic controller; and
   c. means for adjusting the force applied by the press head based on the force control information.

2. The system of claim 1, wherein the force sensor is a load cell.

3. The system of claim 1, wherein the force sensor is attached to the press head drive cylinder by a rod alignment coupler and an adapter stud.

4. The system of claim 1, wherein the means for adjusting the force is a hydraulic pump assembly.

5. The system of claim 1, wherein the system further comprises:
   a. a position sensor attached to the glass molding press for measuring the relative position of the press head and for producing a position signal;
   b. a movement controller coupled to the position sensor for receiving and processing the position signal and for producing movement control information; and
   c. means for adjusting the movement of the press head based on the movement control information.

6. The system of claim 5, wherein the means for adjusting the movement is a hydraulic pump assembly.

7. The system of claim 5, wherein the position sensor is a linear transducer.

8. The system of claim 5, wherein the system further comprises means for switching from controlling the movement of the press head based on the movement control information to controlling the force of the press head based on the force control information.

9. The system of claim 8, wherein the means for switching is responsive to the position signal.

10. The system of claim 8, wherein the means for switching is responsive to the force signal.

11. The system of claim 8, wherein the means for switching includes a linear transducer.

12. The system of claim 8, wherein the means for switching includes a load cell.

13. A press head drive cylinder control system for a glass molding press having a base, a mold table rotatably mounted on the base, a plurality of mold positions on the mold table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station, comprising in combination:
   a. a force sensor operatively attached to the press head drive cylinder for sensing the force applied by the press head and responsively producing a force signal;
   b. a position sensor attached to the glass molding press for measuring the relative position of the press head and producing a position signal;
   c. a controller coupled to the force sensor and the position sensor for receiving and processing the force signal and the position signal and for producing control information; and
   d. means for adjusting the force and the position of the press head based on the control information.

14. The system of claim 13, wherein the force sensor is a load cell.

15. The system of claim 13, wherein the force sensor is attached to the press head drive cylinder by a rod alignment coupler and an adapter stud.

16. The system of claim 13, wherein the position sensor is a linear transducer.

17. The system of claim 13, wherein the controller is a programmable logic controller.

18. The system of claim 13, wherein the controller is a force control module within a programmable logic controller.

19. The system of claim 13, wherein the means for adjusting the force and position is a hydraulic pump assembly.

20. In a glass molding press having a base, a mold table rotatably mounted on the base, a plurality of mold positions on the mold table for locating from one to a plurality of molds thereon, at least one mold at a mold position, a press head, a press head tower, and a press head drive cylinder supporting the press head and being reciprocally mounted to the press head tower for movement of the press head to and from a mold aligned at a molding station, the improvement comprising:

a press head drive cylinder control, the control including a force sensing, force signal providing load cell operatively coupled to the press head drive cylinder, and means responsive to force signals from the load cell for controlling the press head drive cylinder location, movement, and pressing force, said means responsive to force signals including a force control module within a programmable logic controller.

21. In a glass molding press having a mold table mounted on a base, at least one mold position on the mold table for locating at least one mold thereon, a press head, a press head tower, and a press head drive cylinder supporting the press head and being reciprocally mounted on the press head tower for movement of the press head to and from the at least one mold aligned at the at least one molding position, a method of controlling the press head drive cylinder comprising the steps of:

a. sensing a force applied by the press head to a glass gob;
    b. producing a sensing signal corresponding to the sensed force of the press head;
    c. processing the sensing signal and producing a force control signal; and
    d. using a force control module within a programmable logic controller to control the press head drive cylinder based on the force control signal.

22. The method of claim 21, wherein the step of sensing is achieved by a sensor.

23. The method of claim 22, wherein the sensor is a load cell.

24. The method of claim 21, wherein the step of processing the sensing signal is achieved by a programmable logic controller.

25. The method of claim 21, wherein the step of processing the sensing signal is achieved by a force control module.

26. The method of claim 21, further comprising the steps of:

a. measuring the relative position of the press head;
    b. producing a position signal;
    c. processing the position signal and producing movement control information; and
    d. controlling the movement of the press head based on the movement control information.

27. The method of claim 26, wherein the step of measuring the relative position is achieved by a linear transducer.

28. The method of claim 26, further comprising the step of switching from controlling of the press head based on movement to controlling based on force.

29. The method of claim 26, wherein the step of processing the position signal is achieved by a programmable logic controller.

30. The method of claim 26, wherein the step of processing the position signal is achieved by a force control module.

31. The method of claim 30, wherein the force control module is within a programmable logic controller.

32. A press head drive cylinder control system for a glass molding press having a base, a mold table rotatably mounted on the base, a plurality of mold positions on the mold table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station, comprising in combination:

a. a load cell operatively attached to the press head drive cylinder by a rod alignment coupler and an adapter stud for sensing the force applied by the press head and for responsively producing a force signal;
    b. a linear transducer attached to the glass molding press for measuring the relative position of the press head and producing a position signal;
    c. a force control module in a programmable logic controller coupled to the load cell for receiving and processing the force signal and coupled to the transducer for receiving and processing the position signal, the force control module thereby producing force control information and movement control information;
    d. a hydraulic pump assembly for adjusting the movement of the press head based on the movement control information and adjusting the force of the press head based on the force control information; and
    e. means for switching control of the press head based on the movement control information to control based on the force control information.

33. A press head drive cylinder control system for a glass molding press having a base, a mold table rotatably mounted on the base, a plurality of mold positions on the mold table for locating from one to a plurality of molds thereon, at least one mold at a mold position, a press head, a press head tower, and a press head drive cylinder supporting the press head and being reciprocally mounted on the press head tower for movement of the press head to and from a mold aligned at a molding station, comprising in combination:

a. a force sensor operatively attached to the press head drive cylinder for sensing the force applied by the press head and responsively producing a force signal;
    b. a force controller coupled to the force sensor for receiving and processing the force signal and for producing force control information;
    c. means for adjusting the force applied by the press head based on the force control information;
    d. a position sensor attached to the glass molding press for measuring the relative position of the press head and for producing a position signal;
    e. a movement controller coupled to the position sensor for receiving and processing the position signal and for producing movement control information; and
    f. means for adjusting the movement of the press head based on the movement control information.

34. In a glass molding press having a mold table mounted on a base, at least one mold position on the mold table for locating at least one mold thereon, a press head, a press head tower, and a press head drive cylinder supporting the press head and being reciprocally mounted on the press head tower for movement of the press head to and from the at least one mold aligned at the at least one molding position, a method of controlling the press head drive cylinder comprising the steps of:
  a. measuring the relative position of the press head;
  b. producing a position signal;
  c. processing the position signal and producing movement control information;
  d. controlling the movement of the press head based on the movement control information;
  e. sensing a force applied by the press head to a glass gob;
  f. producing a sensing signal corresponding to the sensed force of the press head;
  g. processing the sensing signal and producing a force control signal; and
  h. controlling the press head drive cylinder based on the force control signal.

* * * * *